March 15, 1966 T. A. LARRY 3,240,380
LINE STOPPING AND VALVE INSERTING APPARATUS AND METHOD
Original Filed Aug. 7, 1957 6 Sheets-Sheet 1

INVENTOR:
Timothy A. Larry,
BY Cushman, Darby & Cushman
ATTORNEYS.

FIG. 6
FIG. 7
FIG. 13

March 15, 1966 T. A. LARRY 3,240,380
LINE STOPPING AND VALVE INSERTING APPARATUS AND METHOD
Original Filed Aug. 7, 1957 6 Sheets-Sheet 5

INVENTOR:
Timothy A. Larry,
BY Cushman, Darby & Cushman
ATTORNEYS.

United States Patent Office 3,240,380
Patented Mar. 15, 1966

3,240,380
LINE STOPPING AND VALVE INSERTING
APPARATUS AND METHOD
Timothy Allan Larry, San Clemente, Calif., assignor to
Mueller Co., Decatur, Ill., a corporation of Illinois
Original application Aug. 7, 1957, Ser. No. 676,902, now
Patent No. 3,170,226, dated Feb. 23, 1965. Divided
and this application Aug. 13, 1964, Ser. No. 389,439
3 Claims. (Cl. 220—25)

This application is a division of my copending application, Serial No. 676,902, filed August 7, 1957, now Patent No. 3,170,226, granted February 23, 1965.

This invention relates to an improved apparatus for performing operations on a pipe line, while the latter is in service, to either stop off flow therethrough or insert a permanent valve therein.

Line stopping apparatus and methods are well-known in the art, but in the past usually have involved cutting out a transverse circular opening in the line, inserting an expansible stopper into such opening and expanding the stopper against the side edges of the opening, and within the line, to block flow therethrough. Such line-stopping apparatus and method, however, have not proved to be entirely satisfactory for larger size lines.

It is, therefore, an object of this invention to provide an improved apparatus for stopping off flow through a pipe line without the escape of line fluid to the atmosphere.

Apparatus of the type under consideration usually involves a stopper fitting secured to the line and having an access opening, a large pass-through valve having one end thereof detachably connected to the fitting to open or close the opening therein, and a bell detachably connected to the other end of the valve, the valve and bell in a sense constituting a pressure chamber. By using such apparatus cutting and stopping operations can be performed on the line, without escape of line fluid to the atmosphere, by tools that are movable from within the bell through the valve into engagement with the line. After stopping operations are completed, the fitting opening usually is provided with a closure so that the bell and valve can be removed from the line. The closure securing operation in the past, however, frequently has been very difficult to accomplish.

Accordingly, it is another object of this invention to provide an improved apparatus for securing a closure to a stopper fitting without the escape of line fluid therefrom.

Other objects and advantages of the invention will become apparent from the following description and accompanying drawings in which.

*The stopper or valve-inserting fitting*

Figures 1, 2, 3:
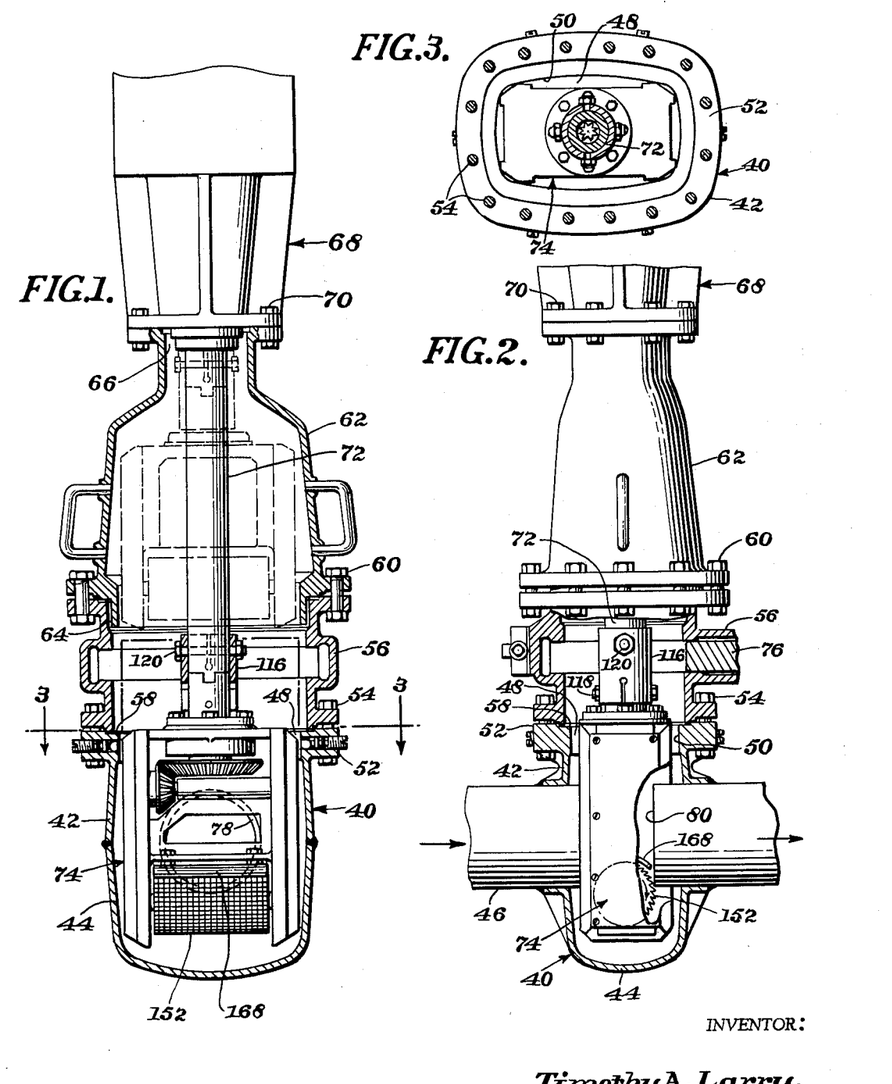
FIGURE 1 is a vertical sectional view of apparatus embodying this invention installed on a pipe line for cutting out a section thereof.
FIGURE 2 is a side elevational view, partly in vertical section, of the apparatus shown in FIG. 1.
FIGURE 3 is a sectional view taken substantially on line 3—3 of FIG. 1.

Referring now to FIGURES 1, 2 and 3 of the drawings, there is shown apparatus embodying this invention for cutting into a pipe line 46, without the escape of fluid therefrom to the atmosphere, to enable the subsequent stopping off of flow through the line or the insertion of a valve thereinto. Such apparatus includes a stopper or valve-inserting fitting 40, formed in two parts 42 and 44 having two pairs of aligned semicircular cutouts in their meeting edges. Hence, the two parts 42 and 44 can be disposed on opposite sides of the line 46 and welded thereto, and to each other, in a conventional manner as shown in FIGURES 1 and 2, to form an enclosure about the line. For the purposes of this invention, the fitting 40 is of a substantially box-like configuration and is elongated in two dimensions laterally of the line 46, as best shown in FIGURE 1, so that the line passes normally through two opposite walls of the fitting in spaced relation to the remaining fitting walls. In order to more effectively resist interior pressures, the walls of the fitting preferably are slightly interiorly concave, as shown in the drawings. The part 44 of the fitting 40 is completely closed, while the part 42 of the fitting is provided with a generally rectangular access opening 48 that is elongated laterally of the line 46 and has slightly concave side edges 50 and curved corners, as shown in FIGURE 3.

*The line cutting apparatus*

The fitting 40 has a peripheral flange 52 surrounding the access opening 48 for sealingly attaching thereto, as by bolts 54 and a gasket 55, a correspondingly flanged end of a conventional pass-through gate valve 56. The opening through the valve is slightly larger than the fitting opening 48 to expose a portion of the gasket 55 on the rim 58 of the latter, for reasons later explained. Sealingly attached to the other, and flanged, end of the gate valve 56, as by bolts 60, is the open mouth of a bell 62 having a lip 64 that depends a slight distance into the corresponding end of the valve. As stated heretofore, the valve 56 and bell 62 form a pressure chamber. For reasons later explained, the interior cross-sectional configuration of the lip 64 is identical to that of the fitting opening 48. The top of the bell 62 has a central opening 66 within which projects the forward end of an enclosed pressure-tight drilling machine 68, which preferably is generally of the type disclosed in Patent No. 1,956,129, and which is sealingly attached to the top of the bell, as by bolts 70 extending through corresponding flanges on the bell and on the forward end of the machine. For the disclosure here, it is sufficient to point out that the drilling machine 68 is provided with an automatic feed wherein the boring bar 72 of the machine is both rotated and advanced at a predetermined feed rate for cutting, and also with a manual feed wherein the bar 72 is selectively advanced or retracted at a rapid feed rate without rotation.

Secured to the end of the boring bar 72 is a cutting tool 74 of a size to be retractable within the bell 62, or at least above the gate 76 of the valve 56, as shown in dotted lines in FIGURE 1. The tool 74 is adapted to be advanced, by the bar 72, through the valve 56, into the fitting 40, and against the line 46, and also to be driven by the bar to cut out a section of the line within the fitting to form opposed parallel flat line ends 78 and 80. Since the details of the tool 74 form no part of the invention claimed herein, no further description is necessary here.

After the cutting operation has been completed, the drilling machine 68 is operated by hand to retract the boring bar 72 and the cutting tool 74 within the bell 62, at which time the gate valve 56 is closed, and the bell, together with the cutting tool and drilling machine, is removed from the gate valve in preparation for the attachment of apparatus for stopping off flow through the line 46 or inserting a valve therein.

*The line stopping apparatus*

Figure 4:
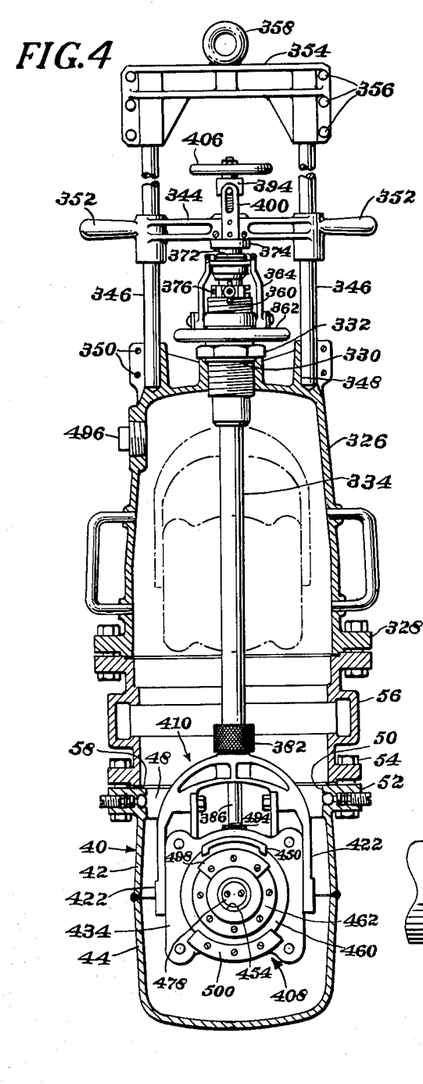
FIGURE 4 is a vertical sectional view of apparatus embodying this invention installed on a line for stopping off flow therethrough.
Figure 5:
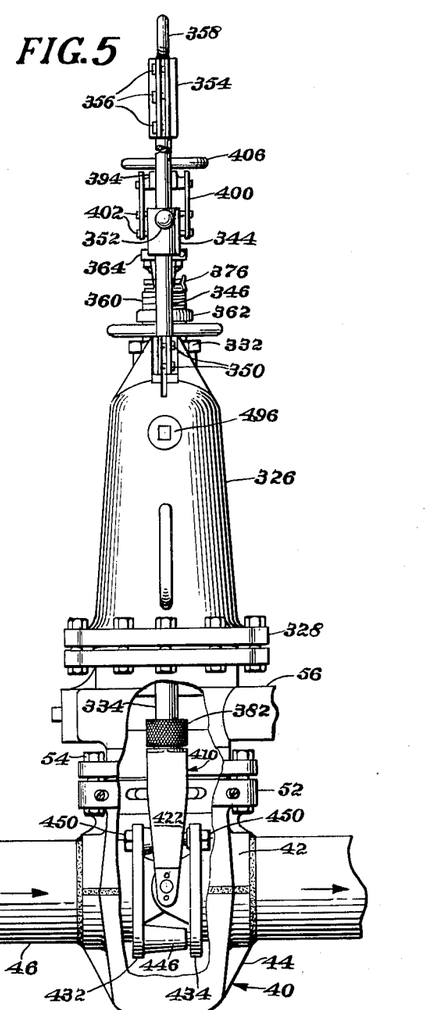
FIGURE 5 is a side elevational view, with parts broken away to show interior details, of the apparatus shown in FIG. 4.
Figures 6, 7, 13:
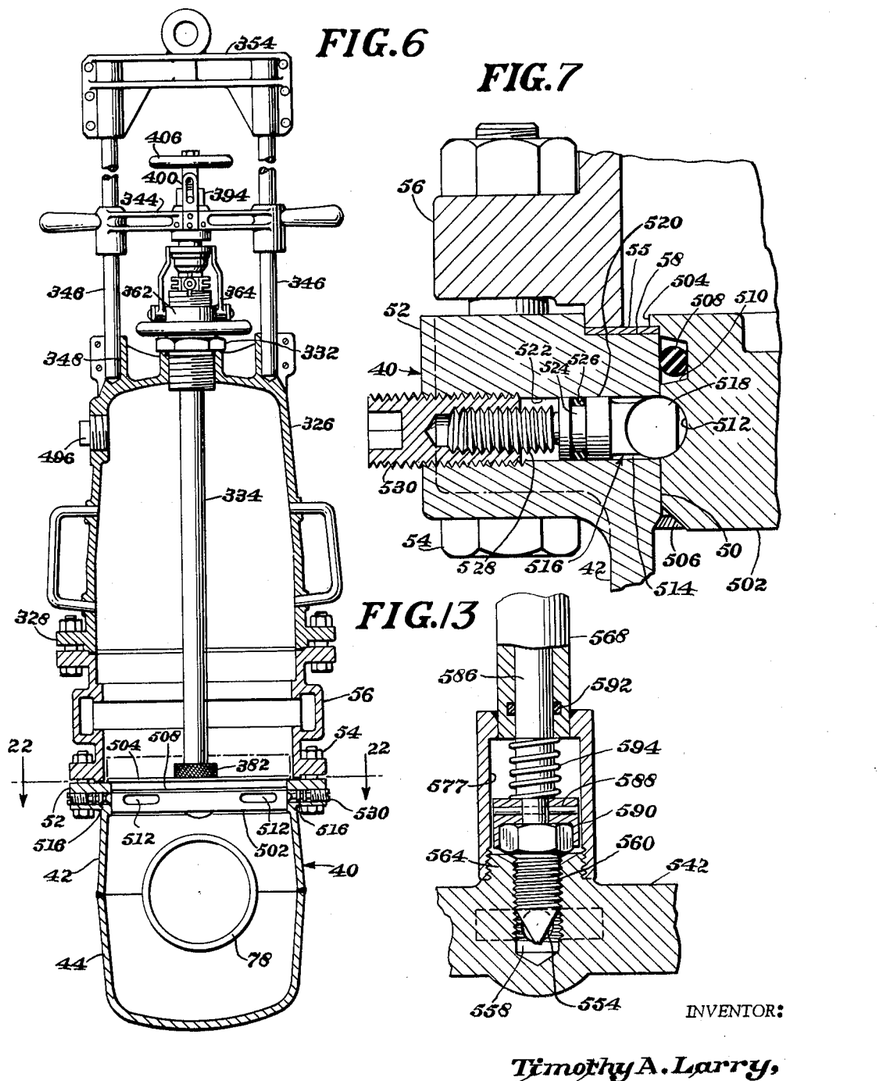
FIGURE 6 is a view corresponding to FIG. 4 illustrating the use of part of the apparatus shown in the latter figure for installing a closure on a stopper fitting.
FIGURE 7 is an enlarged fragmentary vertical sectional view of a portion of the apparatus shown in FIG. 6.
FIGURE 13 is an enlarged fragmentary vertical sectional view of a part of the apparatus shown in FIG. 10.
Figure 8:
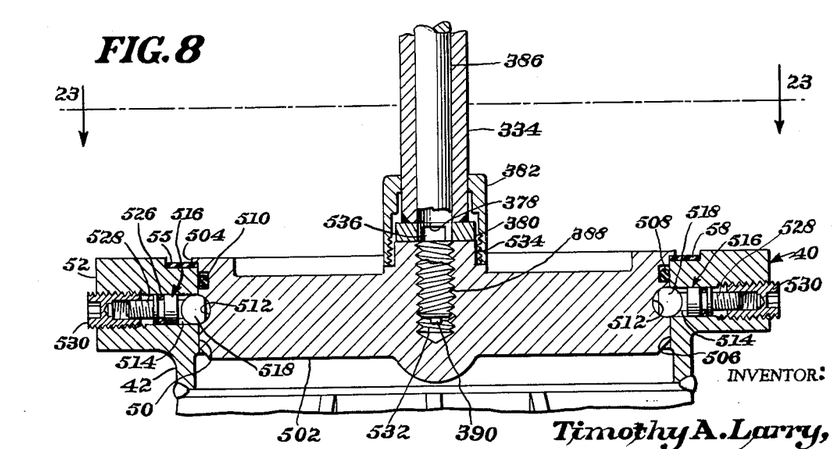
FIGURE 8 is an enlarged fragmentary vertical sectional view of a portion of the apparatus shown in FIG. 6.
Figure 9:
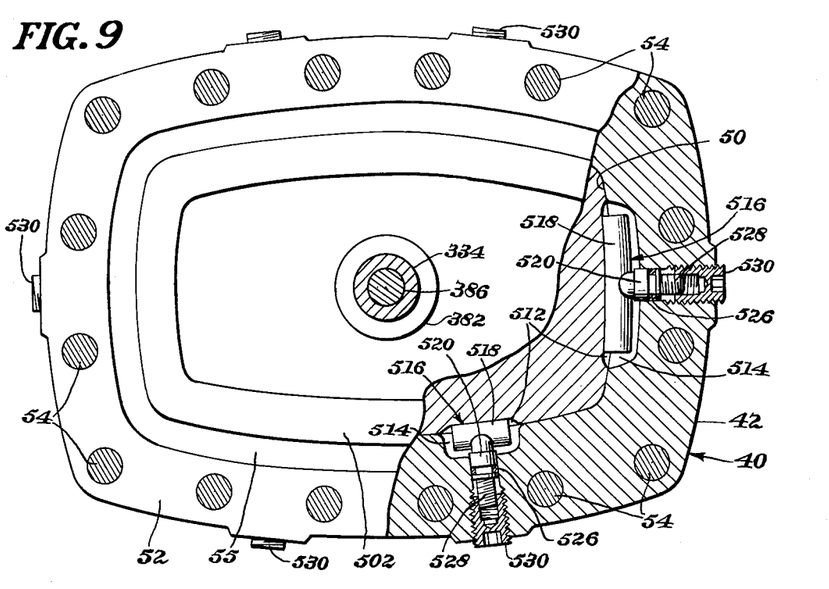
FIGURE 9 is a sectional view, with parts broken away, taken substantially on line 23—23 of FIG. 8.

The stopping apparatus, shown in FIGURES 4 and 5, includes a stopper bell 326, similar to the bell 62, and having a peripheral flange 328 about its mouth for bolted connection to the gate valve 56, the bell and valve again forming a pressure chamber. Threaded into a central aperture in the top of the bell 326, and provided with an O-ring seal 330, is a tubular guide bushing or sleeve 332. Reciprocable through the sleeve is a stopper inserting and operating tube 334. A seal between the tube 334 and the bushing 332 may be effected by an O-ring (not shown) disposed in a circumferential groove in the bushing. The projecting outer end of the tube 334 is reduced in diameter to form a shoulder and the extremity of the reduced end is received, and fixedly secured by clamping screws, within a partially split central opening in a transversely extending guide bar 344. The opposite ends of the bar 344 are provided with guide openings slidably receiving a pair of guide rods 346 that extend parallel to the tube 334 and have their lower ends received in split clamping sockets 348 in the top of the bell 326 and secured therein by clamping screws 350. The outer ends of the bar 344 may be provided with operating handles 352 for sliding the bar along the rods 346 to reciprocate the tube 334 while maintaining the latter against rotation. Preferably, the outer ends of the rods 346 are connected together by a transverse tie bar 354 having split clamping openings to receive the rods which are secured in place by clamping screws 356. The tie bar 354 may be provided with a central lifting eye bolt 358.

The bushing 332 is provided with an outer extension having exterior feed threads 360 engaged by a handled feed nut 362. Pivotally connected to the nut 362 are the arms of a yoke 364 having a notch in its base portion adapted to straddle the tube 334. The base portion of the yoke 364 is adapted to engage over a thrust washer on the tube 334 and having an anti-friction bearing 368 interposed between the washer and another thrust washer seated against the shoulder on the tube. It will be seen that when the yoke 364 is engaged with the upper thrust washer, and secured about the tube by a cotter pin 372, rotation of the nut 362 in one direction will serve to force the tube 334 inwardly of the bell 326 with a force greater than that which can be developed by a manual force exerted on the handles 352 of the guide bar 344. Preferably, a thrust collar 374 is interposed between the guide bar 344 and the upper thrust washer so that an inward force on the bar is exerted, through the washers and bearing, against the shoulder on the tube 334. Additionally, an adjustable clamping collar 376 is mounted on the tube 334 and bears against the upper end of the bushing 332 so that the tube can be supported in any position of vertical adjustment relative to the bell 326.

The inner end of the tube 334 is provided with a key notch in its rim and with a peripheral flange for engagement by a coupling nut 382. Extending through the tube 334, and sealed thereto by an O-ring disposed in a circumferential groove within the tube, is a valve operating rod 386 having a threaded inner end provided with an axially extending transverse flange or key. The outer end of the rod 386 is provided with threads of considerable axial extent, and engaged wtih the threads, outwardly of the guide bar 344, is a nut 394. Guide lugs, on opposite sides of the nut 394, are received in elongated guide slots in upstanding guide plates 400 secured on opposite sides of the guide bar 344 by screws 402. Secured by a nut on a reduced extension on the outer end of the rod 386 is a hand wheel 406 for rotating the rod. From the foregoing construction it will be seen that rotation of the hand wheel 406, wtih the guide lugs engaged with one or the other ends of the slots, will serve to move the rod 386 axially relative to the tube 334, while the latter has a limited range of free reciprocatory movement independently of its rotation by the hand wheel.

*The line stopper*

A stopper assembly 408 embodying this invention, described in detail in my aforesaid application, includes a generally U-shaped frame 410 having a central aperture in its base for slidably receiving the lower end of the valve operating rod 386. The frame 410 is rigidly secured to the lower end of the tube 334 by engagement of the coupling nut 382 with an exteriorly threaded boss surrounding the aperture. An upstanding lug or key on the boss fits within the north in the end of the tube 334 in order to maintain the frame 410, when secured to the tube, in a position extending transversely of the pipe line 46.

Disposed on opposite sides of the frame 410 are two stopper plates 432 and 434 having, on their opposed inner sides, two sets of overlapping wing members. The wing members of each set are provided with oppositely inclined cam slots, within which is received corresponding cam elements (not shown) carried by the arm portions 422 of the frame 410. The construction is such that when relative linear movement between the plates 432 and 434 and the frame 410 takes place in directions extending parallel to the tube 334, the plates are forced apart or drawn toward each other by the interengagement of the inclined surfaces of the camming elements with the corresponding surfaces of the cam slots in the wing members. Thus, when the plates 432 and 434 move toward the base of the frame 410, the plates are forced apart, and when moved away from the base are forced together. The plates 432 and 434 are constantly urged toward each other by coil compression springs (not shown), one at each corner of the plates that are engaged between an inwardly extending flange at the outer end of a hollow boss 446 on the plate 432 and the head of a screw which extends through such boss into threaded engagement with the plate 434.

On the outer face of each plate 432 and 434, at that edge thereof adjacent the base of the frame 410, are arcuate abutment or stop members 450 in position to engage the sides of the line ends 78 and 80. In the normal contracted condition of the stopper assembly 408, i.e., when the plates 432 and 434 are moved toward each other to their smallest extent of separation, the thickness of the stopper assembly, i.e., the distance between the outer faces of the two stopper plates, is less than the separation between the two line ends 78 and 80. In this contracted condition, however, the stop members 450 project beyond the stopper plates a distance sufficient to engage with the sides of the line ends 78 and 80 as the stopper assembly is moved linearly between such line ends.

Figure 11:
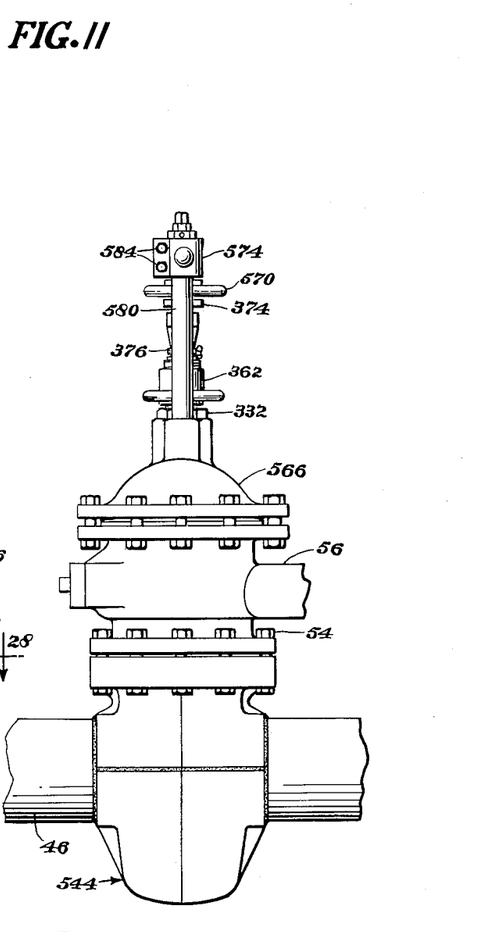
FIGURE 11 is a side elevational view of the apparatus shown in FIG. 10.
Figure 12:
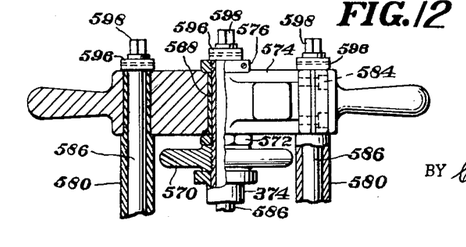
FIGURE 12 is an enlarged fragmentary view, partly in vertical section, of a portion of the apparatus shown in FIG. 10.
Figure 14:
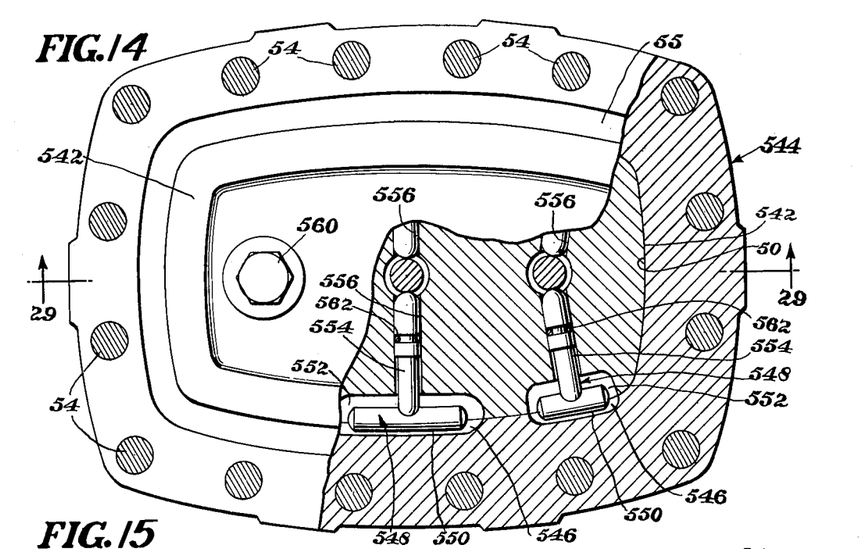
FIGURE 14 is a sectional view, with parts broken away, taken substantially on line 28—28 of FIG. 10.

After the cut has been effected in the line, as described above, and the bell 62 has been replaced with the stopper bell 326 with the stopper assembly 408 secured to the stopper inserting tube 334, and the latter held up by the clamping collar 376 to position the assembly within the bell, as shown in dotted lines in FIGURE 11, the gate valve 56 is opened, the collar 376 loosened, and the guide bar 344 is pushed manually to move the stopper assembly from the bell 326 through the gate valve 56 into the fitting 40 and between the line ends 78 and 80 until the stop members 450 on the stopper plates 432 and 434 engage the sides of the line ends. Continued inward movement of the stopper tube 334, by the handles 352 on the guide bar 344, serves to expand the stopper assembly 408, i.e., force the stopper plates 432 and 434 apart by the interaction of the cam elements and the cam slots, oppositely against the line ends 78 and 80. At this time the yoke 364 is engaged over the upper thrust washer, and the feed nut 362 rotated to impart a greater inserting force to the tube 334 and, consequently, a greater seating force of the plates 432 and 434 against the line ends 78 and 80. Additionally, it will be seen that the yoke 364 firmly retains the stopper plates in engagement against the line ends.

The closure for the fitting

Referring now to FIGURES 6 to 9, there is shown a closure for the stopper fitting 40. The closure comprises a plug 502 which snugly fits within the access opening 48 in the fitting 40 and has a small peripheral flange 504 engageable with the gasket 55 on the rim 58 of the fitting opening to limit the extent of insertion of the plug within such opening. Preferably, the inner edges of the plug 502 are bevelled, as at 506, to facilitate insertion of the plug into the fitting opening 48. A seal for the plug 502 is effected by an O-ring 508 disposed in a peripheral groove 510 in the plug for engagement with a smooth-surfaced peripheral zone in the side edges 50 of the access opening 48. Inwardly of the O-ring groove 510 in the plug 502, the periphery of the latter is provided with a series of peripherally spaced and elongated locking grooves or recesses 512, here shown as being of less than 180° arcuate or semicircular configuration in cross section.

The side edges 50 of the access opening 48 are provided with corresponding recesses 514 that are aligned with the plug recesses 512 when the plug 502 is inserted fully into the opening 48. Disposed in each of the edge recesses 514 is a locking element 516, best shown in FIGURES 7 and 9, of generally T-shaped configuration having a head 518 that is completely receivable within its recess 514 and a stem 520 that projects into a bore 522 extending outwardly through the wall of the fitting 40 from the bottom of the recess 514. The head 518 of each locking element 516 is substantially circular in cross section, for mating engagement within the corresponding peripheral recess 512 in the plug 502. The stem 520 of each element 516 is provided with a smooth-surfaced cylindrical portion, immediately outwardly of the head 518, and such portion is provided with an O-ring groove 524 and an O-ring 526 therein for sealing engagement with the bore 522. Outwardly of the O-ring groove 524 the element 516 has a reduced threaded portion 528 engaged within a threaded socket in the inner end of a screw 530 threaded into a tapped counterbore at the outer end of the bore 522. The engaged threads on the stem portion 528 and the screw socket are of one direction, while the engaged threads on the screw 530 and the counterbore are in the other direction, i.e., one set of threads is right hand and the other left hand. Hence, rotation of the screw 530 in one direction will rapidly project the head 518 of the locking element 516 out of its recess 514 and into locking engagement with the corresponding recess 512 in the plug 502, while rotation of the screw in the opposite direction will rapidly retract the locking element from such locking engagement.

The top of the plug 502 is provided with a central threaded socket 532 for engagement by the threaded end 388 of the valve-operating rod 386. Surrounding the socket 532 is a boss 534 having an upstanding lug or key 536 thereon receivable in the key notch 378 in the rim of the tube 334.

In order to secure the plug closure 502 to the stopper fitting 40, after the line 46 has been unstopped, the coupling nut 382 is detached from the stopped assembly frame 410 and the valve-operating rod 386, by operation of the hand wheel 406, is drawn rearwardly within the tube 334 until the forward end of the rod is substantially flush with that of the tube. The plug 502 is then placed against the end of the tube 334, with the key 536 in the notch 378, and the end 388 of the rod 386 screwed, by the hand wheel 406, into the socket 532 in the plug. For this purpose the threads on the rod end 388 preferably are of the same or greater pitch than the threads 392. Thus, the plug 502 is firmly secured on the end of the tube 334, and correctly oriented for insertion into the fitting opening 48 by the key 536 and notch 378. The stopper bell 326 is then re-attached to the gate valve 56, the clamping collar 376 loosened, and the plug 502 pushed forwardly by the guide bar 344, from within the bell, through the gate valve, and into the access opening 48 in the fitting 40 until the peripheral flange 504 on the plug seats on the gasket 55 on the rim 58 of the fitting opening. When the plug 502 is so inserted, the O-ring 508 effects a tight seal with the fitting 40.

As the O-ring 508 initially seals with the peripheral sealing zone on the edges 50 of the fitting opening 48, it may become quite difficult to manually insert the plug 502 to its full extent because of line pressure with the fitting 40. In this event, the yoke 364 may be engaged with the thrust washer 366 and the feed nut 362 rotated to force the tube 334, and the plug 502, into the fitting opening 48 until the flange 504 on the plug seats on the gasket 55.

After the locking recesses 512 in the plug 504 are aligned, or substantially aligned, with the locking elements 516, the screws 530 are rotated, by an appropriate tool (not shown) to project the heads 518 of the locking elements into locking engagement with the plug recesses 512. In this connection, even if exact alignment between the locking element heads 518 and the locking recesses 512 is not initially obtained, it will be seen that the curved configuration of the heads and the recesses will tend to cam the plug 502 into a position wherein the proper alignment is obtained.

Figure 15:
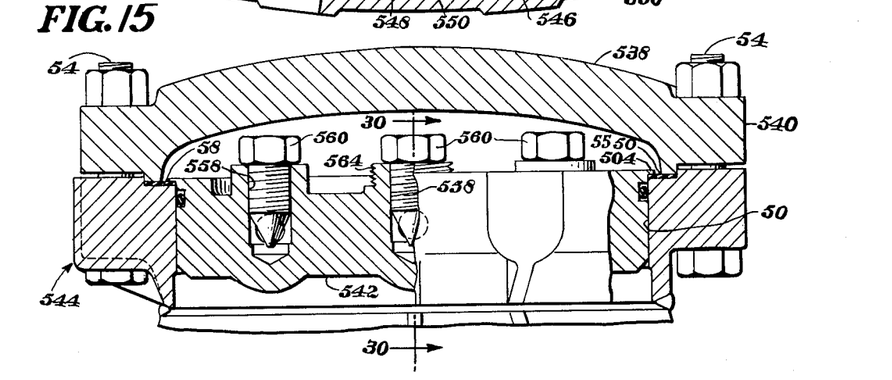
FIGURE 15 is a sectional view taken substantially on line 29—29 of FIG. 14, but showing the addition of a completion cap to the latter figure.
Figure 16:
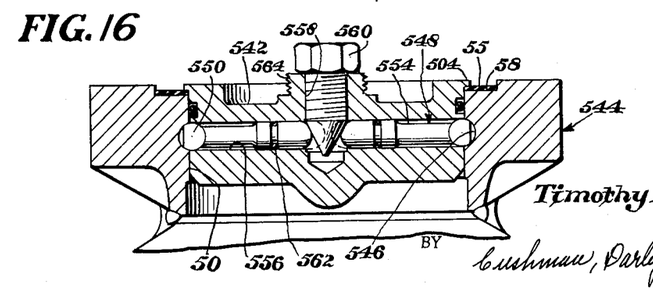
FIGURE 16 is a fragmentary sectional view taken substantially on line 30—30 of FIG. 15.

After the plug 502 is locked in place by the locking elements 516, the rod 386 is unscrewed, by operation of the hand wheel 406, from the plug socket 532, and the tube 334 withdrawn into the stopper bell 326, and held in such position by the clamping collar 376. Thereupon, the stopper bell 326, and also the gate valve 56, are unbolted from the fitting 40 and completely removed therefrom. Thereafter, a cap 538 having a peripheral bolting flange 540 (FIGURE 15) may be secured in place, as by the bolts 54, to the top of the fitting 40. Preferably, the cap 538 seats against the gasket 55 in order to provide an additional seal, and also to prevent dirt from entering between the plug 502 and the edges 50 of the access opening and lodging in the O-ring groove 510 outwardly of O-ring 508 therein.

From the description thus far it will be seen that the opening 48 of the fitting 40 is rectangular in configuration primarily to restrain rotating of the cutting tool 74 and also to serve as a guide for correctly oriented insertion of the line stopper assembly 408. Obviously, any convenient non-circular configuration of the opening 48, the frame of the tool 74, and of the assembly 408 would serve the same purpose. Moreover, it is not essential that the opening 48 be non-circular throughout its entire length or depth. It would be sufficient for the opening 48 to be non-circular for only a section of its depth or length.

Thus, for example, although not shown in the drawings, the opening 48 could be made of guiding non-circular configuration throughout only an inner section, and then flare outwardly to a circular configuration outwardly of such non-circular section. Such circular section, preferably would be of an axial extent which encompasses the zone which includes the locking elements 516 and the surface engaged by the O-ring 508. Such a construction would have manufacturing advantages because the guiding portion can be made to an acceptable tolerance by forging; whereas the surfaces engaged by an O-ring for sealing purposes must be machined, and the machining of a circular surface is accomplished with machines that are less expensive than those necessary to machine a non-circular surface.

It further will be seen that the feature of the invention which includes the locking elements 516, is susceptible of other applications; for example, the securing of a closure plug in the access opening of a service tee, the securing of a valve bonnet to a valve casing, etc.

*The modified line fitting, closure therefor, and attaching apparatus*

Referring now to FIGURES 10 to 16 of the drawing, there is shown a modified type of closure plug 542 for a stopper fitting 544 that also is slightly modified for conformance with the modified closure. In this embodiment of the invention, locking recesses 546, similar to the aforedescribed plug locking recesses 512, are provided in the edges 50 of the fitting opening, while locking elements 548 are carried by the plug 542. As before, the locking elements 548 are substantially T-shaped having heads 550 that are completely disposable within peripherally elongated recesses 552 in the periphery of the plug 542. The stems 554 of the locking elements 548 project into bores 556 in the plug 542 that extend inwardly from the periphery thereof and terminate within threaded sockets 558 extending inwardly from the top of the plug. The inner ends of the stems 554 are rounded, or otherwise provided with inclined surfaces, for camming engagement by the conical ends of camming screws 560 engaged in the sockets 558 and having hexagonal or other non-circular heads. The stem 554 of each locking element 548 is sealed within its corresponding bore 556, as by an O-ring 562 mounted in a circumferential groove in such stem. It will be seen that as a screw 560 is threaded inwardly, the camming engagement between its conical end and the rounded end of a locking element stem 554 will force the locking element 548 outwardly into locking engagement with its locking recess 546 in the edge 50 of the fitting opening. As shown in FIGURE 28 and 29, three such camming screws 560 are employed, one centrally located and each having camming engagement with two locking elements 548. An exteriorly threaded boss 564 surrounds the central socket 558, for reasons later described.

Figure 10:
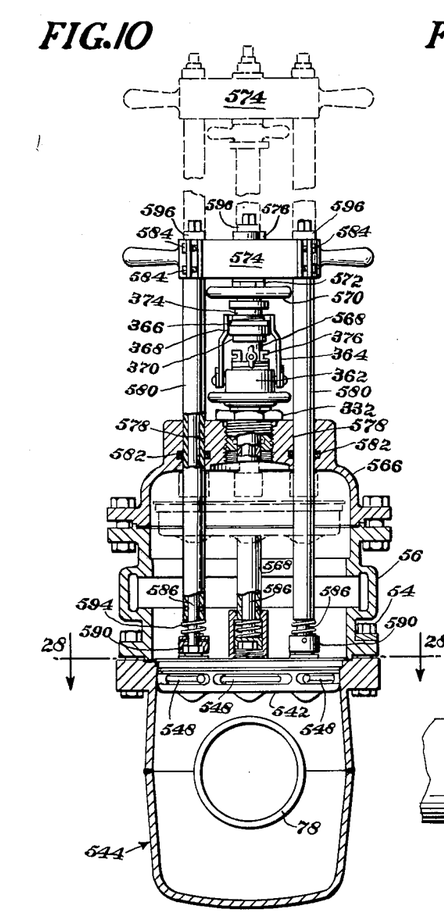
FIGURE 10 is a view corresponding to FIG. 6 but showing a modified form of apparatus for installing a modified form of closure on a modified form of a line stopper fitting.

For installation of the aforedescribed modified type of closure, there is employed a relatively shallow bell 566 that is bolted to the gate valve 56 in lieu of the stopper bell 326. The top of the bell 566 is provided with a central threaded opening for the reception of a guide bushing 332, feed nut 362, and yoke 364, similar to those previously described. Rotatably and reciprocably extending through the bushing 332 is a plug-carrying and inserting tube 568 having thereon a clamping collar 376 below a shoulder against which is stacked a thrust washer 370, an anti-friction bearing 368, another thrust washer 366 for engagement by the yoke 364, and a thrust collar 374, as previously described with respect to the stopper inserting apparatus. Threaded onto the tube 568 against the thrust collar 374 is a hand wheel 570 that is locked against rotation relative to the tube by a jam nut 572. Outwardly beyond the jam nut 572 the tube 568 is reduced and provided with a smooth-surfaced portion that is journalled for rotation in a bushed bearing aperture in a transverse tie bar 574. The bar 574 seats against the jam nut 572, while a split lock nut 576 is threaded onto the outer end of the tube 568 to hold the latter against axial movement relative to the bar. At its lower end the tube 568 has an enlarged threaded socket 577 for reception of the boss 564 on the plug 542.

On opposite sides of the bushing 332, the bell 566 is provided with guiding openings 578, alignable with the plug screws 560 on opposite sides of the central screw, for reciprocably and guidingly receiving a pair of guide tubes 580 extending parallel to the central tube 568. The tubes 580 are sealed within the openings 578 as by O-ring grooves in the side walls of the openings and O-rings 582 disposed in such grooves. The outer ends of the tubes are reduced and secured by clamping screws 584 in split clamping apertures in the opposite ends of the tie bar 574. Rotatably extending through each of the tubes 568 and 580 is a screw-operating rod 586 having secured to the inner end thereof, as by a transverse pin 588, a socket wrench 590 adapted to receive the head of the corresponding camming screw 560 on the plug 542. A seal between each rod 586 and its corresponding tube 568 or 580 is provided, as by an O-ring 592 disposed in a circumferential groove within each tube. Each rod 586 constantly is urged inwardly of its corresponding tube 568 or 580 by a coil compression spring 594 interposed between the inner end of the tube and its wrench 590. The inner end of the central plug-carrying tube is provided with an enlarged interiorly-threaded socket adapted to engage with the plug boss. Inward movement of each rod 586 relative to its corresponding tube 568 or 580 is limited by a collar 596 pinned on the outer end of each rod, for bearing engagement against the outer end of the corresponding tube. The outer end of each rod 586 is squared, as at 598, or of another non-circular configuration, for engagement by a turning tool (not shown).

In order to install the plug 542, the latter is positioned so that the wrenches 590 will engage the heads of the camming screws 560, which are unscrewed sufficiently to permit the locking elements 548 to be pushed back fully into their recesses 552, and the tube 568 is rotated by the hand wheel 570 to thread the socket 577 onto the boss 564 of the plug 542, to thus support the plug on the end of the tube while the engagement between the wrenches 590 and the camming screws orients the plug for proper insertion into the fitting opening. As the socket 577 is threaded onto the boss 564, it will be seen that the rods 586 will move outwardly relative to their tubes 568 or 580, but that the springs 594 will maintain the wrenches 590 engaged with the heads of the screws 560. The plug 542 is then held within the bell 566 by the clamping collar 376 while the bell is bolted to the gate valve 56. Thereupon, the gate valve 56 is open, the collar 376 loosened, and the plug 542 moved, by the bar 574, from within the bell 566, through the gate valve 56, and into the access opening in the fitting 544 until the plug flange 504 seats on the gasket 55 on the rim 58 of the opening. As described heretofore with reference to the plug disclosed in FIGURES 21 to 23, the feed nut 362 and yoke 364 may be employed to force the plug 542 to its full extent of insertion into the fitting opening and to retain the plug in such position.

After the plug 542 has been fully inserted, the outer ends of the rods 586 are engaged and turned to screw the camming screws 560 inwardly and thus force the locking elements 548 outwardly into locking engagement with the locking recesses 546 in the fitting 544, and to retain such elements in their locking position. Thereupon, the central plug-carrying tube 568 is rotated by the hand wheel 570 to unscrew the socket 577 from the boss 564 on the plug 542. Whereupon, the tubes 568 and 580, together with their rods 586, are drawn upwardly into the bell 566, by the tie bar 574, and the clamping collar 376 retightened to retain the tubes in this position. Thereafter, the bell 566 and the gate valve 56 are unbolted and removed from the fitting 544 and a cap 538 installed thereon.

In the event that removal of the closure 542 is desired for subsequent line-stopping operations, the cap 538 is removed, and the gate valve 56 and bell 566 are re-bolted to the fitting 544. The tubes 568 and 580 are then pushed inwardly until the socket 577 on the central tube 568 engages the boss 564 on the plug 542. Thereupon, the tube 568 is rotated, by the hand wheel 570, to screw the socket 577 onto the boss 564. In this connection, it will be seen that during this operation the rods 586 can move slightly rearwardly to accommodate the necessary relative axial movement between the central rod and its tube 568 occasioned by the abutting engagement between the central screw 560 and the central wrench 590. The rods 586 may then be turned until their wrenches 590 engage with the heads of the screws 560, and then further rotated to unscrew the camming screws 560 and permit line pressure to force the locking elements 548 back into their plug recesses 552 and out of locking engagement with the locking recesses 546 in the fitting 544. Whereupon, the tube 568 may be moved outwardly to withdraw the plug 542 into the bell 566, and the gate valve 56 closed, so that the bell, together with the plug, can be removed for connection of the aforedescribed stopping apparatus to the gate valve. In the event that line pressure is not effective, for any reason, to retract the locking elements 548, it will be seen that withdrawing movement of the plug 542, by the tube 568, will be effective to cam the locking elements back into their corresponding plug recesses 552 because the locking recesses 546 in the fitting 544 are of less than 180° semi-circular configuration.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:
1. In line-stopping or valve-inserting apparatus including a fitting member adapted to be secured on a pipe line to define an enclosure thereabout provided with an access opening, and a closure member insertable into the opening, the combination comprising:
   a plurality of elongated locking recesses in two opposite sides of the peripheral edge of the access opening;
   a plurality of corresponding elongated recesses in the periphery of the closure member;
   a plurality of elongated locking elements carried by the closure member within, and movable outwardly of, said peripheral recesses therein;
   means defining bores in the closure member extending inwardly from the bottom of each of said recesses therein;
   stem means on each of said locking elements extending into said corresponding bores;
   O-ring sealing means on each of said stem means between each of said stem means and the wall of the corresponding bore;
   a plurality of close-end sockets in the closure member extending inwardly from the top thereof, said bores terminating within said socket;
   means carried by the closure member and operable from the top thereof including cam means in each of said sockets engageable with said stem means for advancing said elements into, and retaining the latter in, locking engagement with the corresponding recesses in said access opening edge;
   sealing means carried by one of the members for engagement between the opposed surfaces of said opening edge and the periphery of the closure member outwardly of said recesses to effect a seal between the members; and
   each of said locking elements having a cam surface which engages within said locking recesses and cam the locking elements out of said locking recesses when said cam means is disengaged.

2. The structure defined in claim 1 including means defining a bevelled surface on the inner edge of the closure member.

3. The structure defined in claim 1 including a peripheral flange on the closure member engageable with the rim of the access opening to align the locking elements with the opening edge recesses.

References Cited by the Examiner

UNITED STATES PATENTS

| | | | |
|---|---|---|---|
| 283,380 | 8/1883 | Cooper | 292—43 |
| 1,275,207 | 8/1918 | Backoven | 229—155 |
| 1,560,489 | 11/1925 | Yager | 220—55 |
| 2,298,511 | 10/1942 | Rathbun | 292—155 |

THERON E. CONDON, *Primary Examiner.*

GEORGE E. LOWRANCE, *Examiner.*